Figure 1:
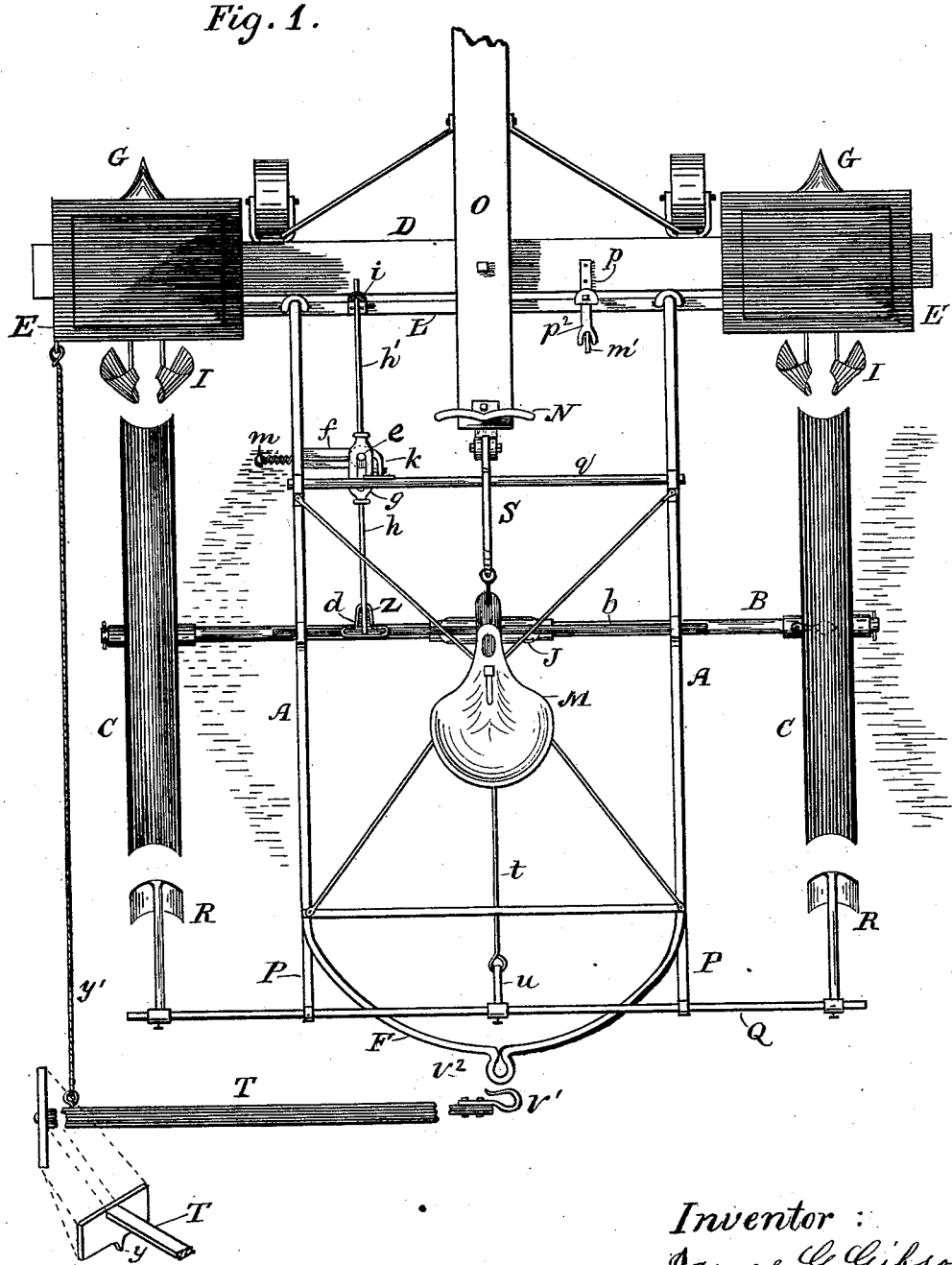

(No Model.) 2 Sheets—Sheet 1.

J. G. GIBSON.
CORN PLANTER.

No. 420,652. Patented Feb. 4, 1890.

Witnesses:
W Burris
R T Campbell

Inventor:
James G. Gibson
By G. B. Towles
Attorney (No Model.) 2 Sheets—Sheet 2.
J. G. GIBSON.
CORN PLANTER.
No. 420,652. Patented Feb. 4, 1890.
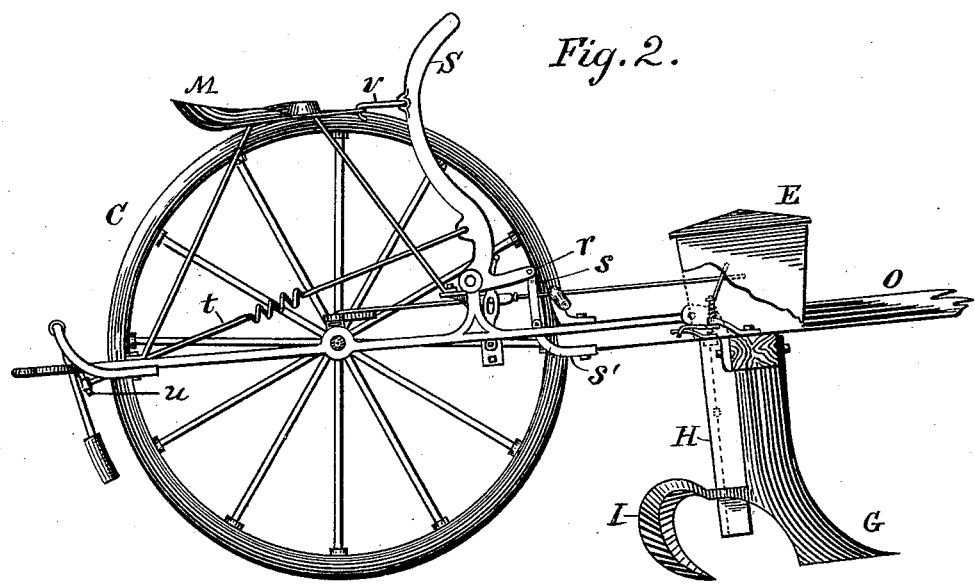
Witnesses:
W. Burris
R. T. Campbell.
Inventor:
James G. Gibson
By G. B. Towles Atty

UNITED STATES PATENT OFFICE.

JAMES G. GIBSON, OF PEORIA, ILLINOIS.

CORN-PLANTER.

SPECIFICATION forming part of Letters Patent No. 420,652, dated February 4, 1890.

Application filed February 14, 1889. Serial No. 299,894. (No model.)

*To all whom it may concern:*

Be it known that I, JAMES G. GIBSON, a citizen of the United States, residing at Peoria, in the county of Peoria and State of Illinois, have invented certain new and useful Improvements in Corn-Planters; and I do hereby declare the following to be a full, clear, and exact description of the invention, such as will enable others skilled in the art to which it appertains to make and use the same.

This invention relates to corn-planters in which the planting mechanism is driven from the axle of the supporting-wheels; and it consists in certain improvements in the construction of such machines, as hereinafter described and claimed.

In the accompanying drawings, Figure 1 is a plan view of a corn-planter provided with my improvements. Fig. 2 is a side view of the same, one wheel being removed. Figs. 3 and 4 illustrate a shifting-lever and its connections. Fig. 5 shows in section a slotted drum fast on the axle and a device which engages with the drum. Fig. 6 represents a retaining device, which is connected with the seed-bar.

A designates the side bars of the frame of the planter, the same being mounted on the axle B, on which are the carrying-wheels C. The forward ends of the bars A are pivotally connected with a cross-beam D, on which are mounted the seed-boxes E, the rear ends of said bars being connected by a curved bar or rod F.

To the cross-beam D under each seed-box is made fast the standard of a share or cutter G, which forms a furrow in the soil, turning it in opposite directions from the center of the furrow. Back of each cutter is a spout H, which extends downward from a seed-box E, and at the rear of the spout the covering-shovels I are fixed in position to cover the seed dropped from the spout. The wheels C, being in line with the cutters and spouts, press the soil over the seed after it is covered by the shovels I.

J indicates a slotted drum-cam, which is provided with an inclined or oblique slot $a$, and is secured centrally to the axle B and is rotated therewith. Above the axle is a flat rod $b$, which is held loosely in bearings carried by the side bars A, and carries a head which engages with the drum in the diagonal slot $a$. This head is formed of a flanged plate $c$, which is formed with a cylindrical projection $c'$, and is perforated to receive a securing-bolt. A ring $c^2$ is placed on the cylinder as a bearing-surface, being adapted to move freely thereon. A washer $c^3$ is placed against the cylinder, and the parts are secured together and to the rod $b$ by a bolt and nut, the said rod fitting beween the flanges of the plate $c$. The head thus formed, being partly within the slot $a$ of the drum, oscillates as the drum revolves, and imparts a reciprocating movement to the rod $b$.

Fixed to the rod $b$ is a flanged plate $d$, which is in the form of a shallow T-shaped vessel, and is placed with the upper bar of the T form on and along the rod $b$, with the stock extending forward, as seen in Fig. 1.

K indicates a standard, at the top of which is formed a stud $e$, the said standard being supported by an arm $f$, extending from a side bar A of the frame. A slotted plate $g$ is placed loosely on the standard, the stud $e$ entering the slot, so that said plate has a limited movement lengthwise. From the rear end of the plate $g$ extends a rod $h$, the free end of which is bent downward and rests in the flanged T-plate $d$. From the forward end of plate $g$ extends another rod $h'$, the free end of which extends through a perforated lug $i$, which is fastened to a transverse bar L, which is the seed-bar, and extends under each of the seed-boxes of the planter. A foot-lever $k$ is connected at its lower end with the standard K by a bolt or rod $m$, which passes through the lever, the standard, and the support $f$, and is secured by a nut $n$. A stout tension-spring $n'$ is placed on the bolt $m$ and bears against the bolt-head and the support $f$, holding the lever $k$ close against the standard. At the point of connection of lever $k$ with the standard the latter is provided with an annular flange or tubular projection $n^3$ and angular ribs or projections $n^2$. The lower end of said lever fits over the tubular projection $n^3$ and has notches on its inner face, which are adapted to receive the projections $n^2$, so that when the lever has been moved either forward or rearward it will be retained in position. The lever $k$ is connected with the slotted plate $g$ by a bolt $o$, which is passed through a slot in the lever, so that the said plate with its attached rods may be moved forward or rearward by means of the lever.

As will be seen, the reciprocating movement of the seed-bar is produced by the vibration of the rods $h$ and $h'$, which are carried by the plate $g$, such vibration being caused by the T-shaped vessel on the rod $b$ engaging the rod $h$, the bent end of which rests in said vessel. When the lever $k$ is thrown forward, the rod $h$ is drawn forward and its hook end is brought into the narrow forward part $z$ of the vessel $d$ in position to be engaged by said vessel as the rod $b$ reciprocates; but when the lever $k$ is thrown rearward the hook end of rod $h$ is pushed to the rear part of the vessel $d$, where the latter is wide enough to allow the movement of rod $b$ without engaging the rod $h$, and consequently there is no movement of the latter or of the seed-bar. An arm $m'$ is fastened to the seed-bar L and extends at right angles therefrom. Another arm $p$ extends from the cross-beam D and is pivotally connected at its outer end by a bolt $p'$ with a bent fork $p^2$, which straddles the arm $m'$, as seen in Fig. 6. On the bolt $p'$ is placed a spiral spring, which presses against arm $p$ and against a nut on the upper end of the bolt, so that the arm $p$ and the fork $p^2$ are held closely together. The adjoining surfaces of the arm $p$ and fork $p^2$ are formed like the adjoining surfaces of the lever $k$ and standard K, the said arm $p$ being provided with tubular and angular projections, and the fork $p^2$ having notches to receive such angular projections, so that when the seed-bar in operation is thrown in one direction, the fork turning with it, no back movement of said bar will be caused by the jarring of the moving planter.

M indicates the driver's seat, which is supported by rods connected with the frame of the machine, a foot-rest N being secured to the draft-pole O. At the rear of the machine a horizontal rod Q is loosely held by the curved arms P, which are fastened to the frame. To the rod Q are secured two scrapers R, each of which is held in the rear of one of the wheels C, for the purpose hereinafter stated. A hand-lever S is pivoted on a cross-rod $q$, the ends of which extend in uprights carried by the side bars A, said lever being provided with a short arm $r$, which extends forward and is connected by a link $s$ with an arm $s'$, which is fastened to the draft-pole. The lever S is also provided with a hook $v$, by which it may be connected with the driver's seat, the lever being moved backward. When the planter is in operation, the lever is disconnected from the seat and the scrapers R through the rod $t$ and arm $u$ are brought against the wheels C and serve to clear them of any dirt adhering. When the operation is discontinued, the lever S is hooked to the seat, the front part of the machine being thus lifted and the cutters and shovels raised from the ground, and the scrapers R are held in position away from the wheels C by the rod U, connected with the lever.

T indicates a rod one end of which is provided with a hook $v'$ for its attachment in an eye $v^2$ of the curved rod F at the rear of the frame. To the outer end of the rod T is secured a marking-board, which is provided with a point $y$, and said rod is connected by a cord $y'$ with one of the seed-boxes E. This rod, when in position being connected with the curved rod F and by cord $y'$ with a seed-box, extends outward at right angles with the line of draft, with the marking-board resting on the ground, so that as the planter is drawn forward it will mark a line in the ground which will be parallel with the line of draft and serve as a guide-line for the planter on its return across the field. The rod T is made of a certain length, so that the guide-line will be the same distance from the track of the nearer wheel as the distance between the two wheels of the planter.

I claim—

1. In a planter, the combination, with a seed-bar and the axle of the carrying-wheels, of a drum provided with an oblique slot and secured to said axle, a rod loosely secured in position parallel with said axle and provided with a head to connect with said slotted drum, a T-formed flanged plate which is fastened to said rod in position as shown, a slotted pivoted rod which has connection at one end with said flanged plate and at the opposite end with the seed-bar, and a pivoted lever which has pivotal connection with said slotted rod, so that the latter may be moved lengthwise, substantially as and for the purposes described.

2. The combination, with the reciprocating rod which is provided with the T-formed plate $d$, which is fastened to said rod in the position shown, of a vibratory rod which is loosely mounted on a fixed support and constructed to connect with said plate $d$, and means, substantially as described, for moving said vibratory rod lengthwise, substantially as set forth and described.

3. The combination, with a standard which is connected with the frame of a planter and is provided with a stud $e$, of the slotted plate $g$, mounted on said standard, rods $h$ and $h'$, extending from said plate $g$ and constructed to connect, respectively, with a reciprocating rod and with the seed-bar, and a pivoted lever $k$, which is connected with plate $g$, substantially as set forth and described.

4. The combination, with the reciprocating seed-bar, of an arm $m'$, secured thereto, a fixed arm $p$, a bent fork $p^2$, and a securing-bolt which is provided with a spring, substantially as set forth and described.

In testimony whereof I have affixed my signature in presence of two witnesses.

JAMES G. GIBSON.

Witnesses:
   HENRY W. WELLS,
   L. M. THURLOW.